United States Patent

[11] 3,607,463

[72] Inventors Joshyo Kinoshita
Santa Clara;
William W. Stein, Palo Alto, both of Calif.
[21] Appl. No. 749,777
[22] Filed Aug. 2, 1968
[45] Patented Sept. 21, 1971
[73] Assignee Varian Associates
Palo Alto, Calif.

[54] METHOD FOR GROWING TIN-DOPED N-TYPE EPITAXIAL GALLIUM ARSENIDE FROM THE LIQUID STATE

5 Claims, 4 Drawing Figs.

[52] U.S. Cl. .......... 148/171, 252/62.3
[51] Int. Cl. .......... H01l 7/38
[50] Field of Search .......... 148/172, 171, 1.5

[56] References Cited

UNITED STATES PATENTS 3,463,680 8/1969 Melngailis et al. .......... 148/172

*Primary Examiner*—L. Dewayne Rutledge
*Assistant Examiner*—E. L. Weise
*Attorneys*—William J. Noland and Leon F. Herbert

ABSTRACT: A charge consisting of gallium, gallium arsenide, and tin was heated to produce a liquid molten solution of gallium, arsenic, and tin with the atom fraction of tin being below 80 percent in the solution. The charge and a gallium arsenide substance are preferably heated in a refractory boat contained within a hydrogen furnace tube, such boat being tilted at an angle such that the substrate wafer is above the liquid level of the solution. The boat is then tipped to cover the heated surface of the gallium arsenide substrate member with the liquified charge solution. The furnace is then allowed to cool, resulting in an epitaxial growth of tin-doped N-type gallium arsenide upon the gallium arsenide substrate member. Growth of the epitaxial layer occurs within a few minutes, after which the excess charge is scraped from the layer and the substrate member and is then treated with a solution of molten tin bromide to facilitate removal of the excess tin and gallium. The tin bromide and excess tin and gallium are removed from the epitaxial surface by treatment with hydrochloric acid. By varying the atom fraction of tin in the liquified solution, the net donor carrier concentration in the resultant epitaxial layer can be readily varied within the range from $10^{16}$ to $10^{18}$ per cubic centimeter.

PATENTED SEP 21 1971 3,607,463

INVENTORS
JOSHYO KINOSHITA
WILLIAM W. STEIN
BY Wm J. Nolan
ATTORNEY

METHOD FOR GROWING TIN-DOPED N-TYPE EPITAXIAL GALLIUM ARSENIDE FROM THE LIQUID STATE

DESCRIPTION OF THE PRIOR ART

Heretofore, *n*-type epitaxial gallium arsenide has been grown from the liquid solution of gallium arsenide in tin. However, it is found that when tin-doped epitaxial gallium arsenide is grown from a liquid solution of gallium arsenide in tin, the tin *n*-type dopant concentration in the resultant epitaxial layer has a high concentration falling within the range of $5\times10^{18}$ to $1\times10^{19}$ per cubic centimeter. For many applications of devices employing a tin-doped layer of epitaxial gallium arsenide, such a relatively high carrier concentration is too high. More specifically, for certain varactor applications and inpatt oscillator applications it is desired to grow an epitaxial tin-doped gallium arsenide layer having carrier concentrations falling within the range of $10^{16}$ to $10^{18}$ per cubic centimeter. This prior art method for growing epitaxial tin-doped gallium arsenide from a liquid solution of gallium arsenide in tin is described in an article titled "Epitaxial Growth from the Liquid State and Its Application to the Fabrication of Tunnel and Lasar Diodes" appearing in the Dec. 1963 issue of the RCA Review, pp. 603–615. This article also discloses that the tin solvent for the gallium arsenide may be replaced by gallium and the type and degree of doping may be controlled by adding the requisite amount of a donor or acceptor impurity to the solvent melt; examples are given of doping with tellurium and zinc to obtain *n*and *p*-type gallium arsenide material, respectively. However, there is no mention of tin as the dopant nor is there to be found any example of dopant concentration in the melt to obtain tin-doped gallium arsenide with donor carrier concentration within the range of $10^{16}$ to $10^{18}$.

Other prior art workers have expanded on the aforementioned method for growing *n*-type gallium arsenide from a gallium solution of gallium arsenide and an impurity. More specifically, such work is described in an article titled "-Preparation and Characteristics of Gallium Arsenide," published as paper 3 in the 1966 Symposium on Gallium Arsenide, pp. 16–22. In this work, the dopant in the resultant epitaxial gallium arsenide is selenium and the selenium concentration in the resultant material is controlled by matching the measured doping level of the impurity in the gallium arsenide, used in the charge, to that level which it is desired to obtain in the deposit. However, it has been found that when tin is used as the doping impurity, rather than selenium, the doping level of tin in the gallium arsenide used in the charge does not correspond to the resultant doping level in the grown tin-doped gallium arsenide epitaxial layer. Rather, the resultant grown carrier concentration is found to be temperature dependent and to differ by a factor of about 10,000 from that in the gallium arsenide charge material.

SUMMARY OF THE PRESENT INVENTION

The principal object of the present invention is the provision of a method for growing tin-doped *n*-type epitaxial gallium arsenide from the liquid state.

One feature of the present invention is the provision, in the method of growing tin-doped *n*-type epitaxial gallium arsenide from the liquid state, of the step of producing a liquified molten solution of gallium arsenide, arsenic, and tin with the atom fraction of tin in the solution being below 80 percent, whereby a net donor carrier concentration in the resultant *n*-type epitaxial gallium arsenide can be obtained within the range of $10^{16}$ to $10^{18}$ per cubic centimeter.

Another feature of the present invention is the same as the preceding feature wherein the atom fraction of gallium in the liquified solution is greater than 50 percent.

Another feature of the present invention is the same as any one or more of the preceding features wherein the charge to be heated consists of gallium, gallium arsenide and tin.

Another feature of the present invention is the same as any one or more of the preceding features wherein excess charge material is scraped from the epitaxially grown layer and the scraped surface is treated with molten solution of tin bromide to facilitate removal of excess tin and gallium.

Other features and advantages of the present invention will become apparent upon perusal of the following specification taken in connection with the accompanying drawings wherein:

DESCRIPTION OF THE PREFERRED EMBODIMENTS

Figure 1:
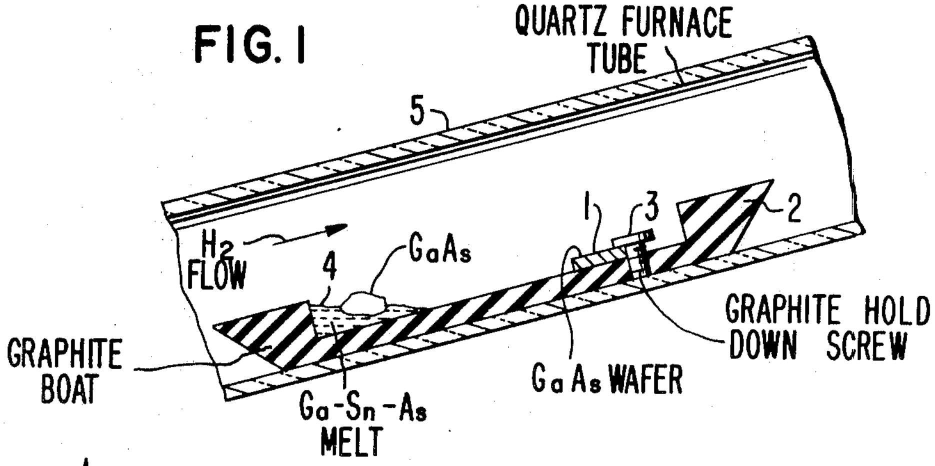
FIG. 1 is a schematic diagram of the apparatus employed in the method of the present invention.

Referring now to FIG. 1, there is schematically shown the apparatus for practicing the method of the present invention. A single crystal, gallium arsenide wafer 1, is held against the bottom of a refractory boat 2, as of graphite, via a graphite holddown screw 3. The gallium arsenide wafer may be doped with any desired impurity to any desired concentration to produce *n*, *n*+, *p*, *p*+, or intrinsic material. In a preferred embodiment, the gallium arsenide wafer 1 is preferably doped with tin to a relatively high carrier concentration, as of $10^{18}$ to $10^{19}$ per cubic centimeter to produce an *n*+ substrate. The wafer 1 preferably has the (100) crystal plane exposed to receive the epitaxial gallium arsenide layer.

A charge 4, which consists of gallium, gallium arsenide and tin, is disposed at the opposite end of the boat 2 from the wafer 1. The boat is placed within a quartz furnace tube 5 containing a flow of purified hydrogen gas. The furnace tube 5 is tilted such that the gallium arsenide wafer is disposed above the liquid level in the graphite boat 2.

Figure 2:
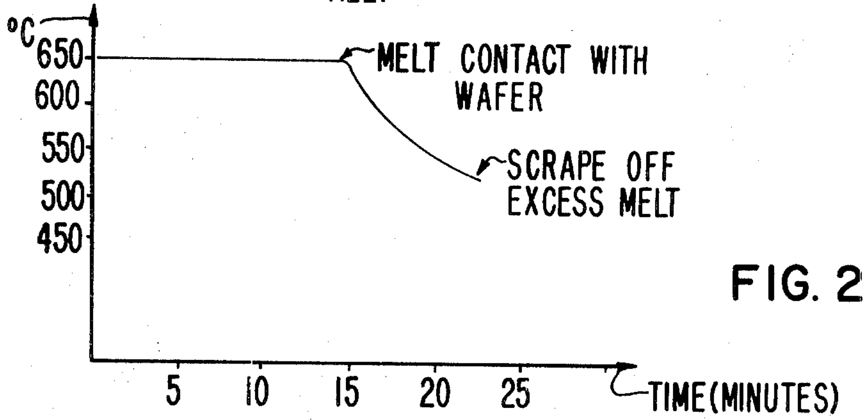
FIG. 2 is a plot of temperature in degrees C. versus time in minutes, depicting the thermal cycle employed in the method of the present invention.

The boat 2 and its contents minus wafer 1 are heated to a temperature of approximately 800° C. and held at this temperature for a half hour. Then the power to the furnace is shut off and the melt allowed to cool to approximately room temperature. Then wafer 1, which has been previously chemically polished to remove surface damage, is put into the boat and held down by the graphite holddown screw 3. The furnace is heated to 650° C., at which time the boat 2 and its contents are then pushed into the 650° C. hot zone. After allowing the boat and its contents to remain at 650° C. for approximately 15 minutes, the heating power is turned down as shown in FIG. 2 and the furnace is tipped so that the molten solution of gallium, arsenic, and tin covers the exposed surface of the gallium arsenide wafer 1. At this time the melt is saturated with gallium arsenide.

Figure 4:
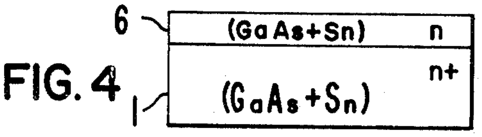
FIG. 4 is a schematic line diagram of a resultant tin-doped gallium arsenide epitaxial layer grown upon an *n*+ gallium arsenide tin-doped substrate.

As the furnace cools, precipitation of gallium arsenide from the solution and epitaxially growth upon the substrate 1 occurs. In approximately 7 minutes, and at approximately 550° C., the furnace is tilted back to its original position. The excess charge material, clinging to the epitaxial layer, is scraped from the surface of the epitaxial layer 6, as shown in FIG. 4.

The wafer 1 with its epitaxial layer 6 is then dipped in a solution of molten tin bromide which causes the tin and gallium to ball up and roll off the wafer 1. The wafer 1 is then dipped in hydrochloric acid to dissolve off the residual tin bromide and excess residual tin and gallium.

Figure 3:
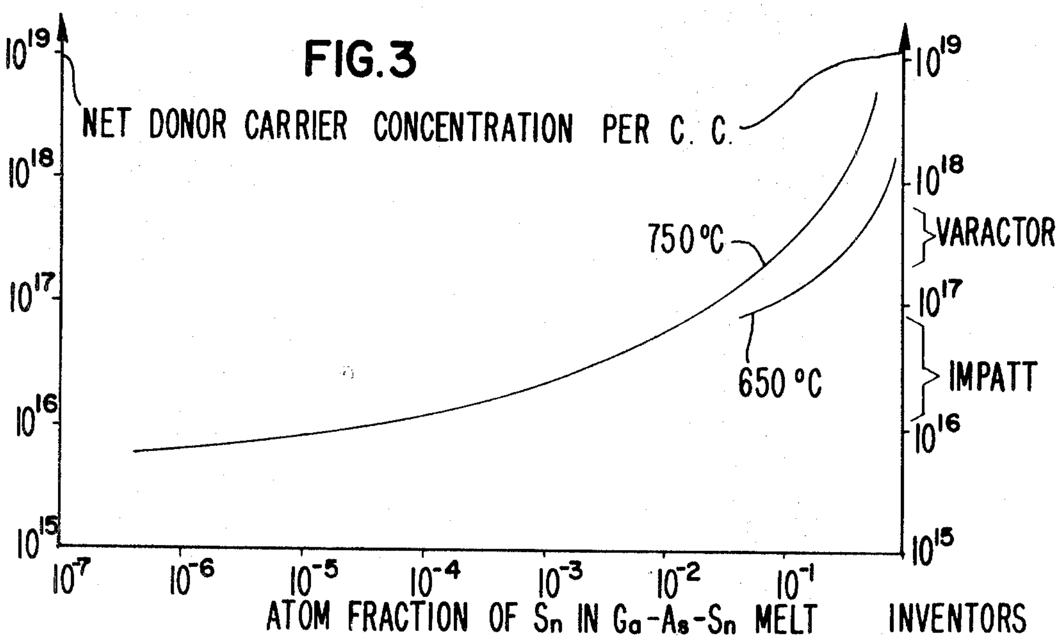
FIG. 3 is a plot of net donor carrier concentration per cubic centimeter versus atom fraction of tin in the gallium-arsenic-tin melt for two melt-wafer contact temperatures.

The net donor carrier concentration per cubic centimeter in the resultant tin-doped epitaxially grown layer 6 is readily controlled within the range of $10^{16}$ to $10^{18}$ per cubic centimeter by controlling the atom fraction of tin in the gallium-arsenic-tin molten liquified charged solution. More specifically, the graph of of FIG. 3 depicts the resultant net donor carrier concentration in the epitaxial layer versus the atom fraction of tin in the molten solution of gallium-arsenic-tin for two separate melt-wafer contact temperatures, namely, 650° C. and 750° C. From the graph of FIG. 3 it is seen that the carrier concentration in the epitaxial layer within the range of $10^{16}$ to $10^{18}$ per cubic centimeter is obtained over a wide range of atom fractional proportions of tin in the melt, such atom fraction of tin always falling below 80 percent of the liquified solution. Moreover, it is seen from the plot of FIG. 3 that over substantially all of the range of carrier concentration if interest ($10^{16}$—$10^{18}$ cm. $^{13}$), the atom fraction of tin in the melt is less than 50 percent. Thus, the liquified solution employed over most of the range of interest is aptly described as a solution of gallium arsenide and tin in gallium.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method for epitaxially growing tin-doped *n*-type gallium arsenide from a molten solution, the steps comprising:

heating a charge material to produce a molten solution of gallium arsenide, gallium, and tin, with the atom fraction of tin being less than 80 percent of the solution and the atom fraction of gallium being greater than the atom fraction of arsenic;

causing the molten solution to contact the heated surface of a gallium arsenide substrate;

reducing the temperature of the molten solution and the contacted substrate to cause a tin-doped *n*-type gallium arsenide layer to epitaxially grow on the substrate; and removing the excess charge material from the epitaxially grown layer.

2. The method as specified in claim 1, wherein the atom fraction of gallium in the molten solution is greater than 50 percent.

3. The method as specified in claim 1, wherein the charge material and substrate are heated in a tilted refractory boat, and the boat is tilted in the opposite direction to cause the molten solution to flow and contact the heated substrate.

4. The method as specified in claim 3, wherein the excess charge material is removed by scraping the excess material from the grown epitaxial layer, and contacting the scraped surface with a molten solution of tin bromide to facilitate removal of the excess tin and gallium, and contacting the tin bromide treated surface with hydrochloric acid to remove the tin bromide and residual tin and gallium.

5. The method as specified in claim 1, wherein the substrate is an *n*-plus tin-doped gallium arsenide single crystal having the (100) crystal surface oriented toward the molten solution causing the epitaxial growth to occur on the (100) surface of the substrate.